United States Patent [19]

Kotaka

[11] 4,290,132

[45] Sep. 15, 1981

[54] FOCUS SERVO DEVICE FOR USE IN AN OPTICAL INFORMATION READ-OUT DEVICE

[75] Inventor: Fumitaka Kotaka, Tokorozawa, Japan

[73] Assignee: Pioneer Electronic Corporation, Tokyo, Japan

[21] Appl. No.: 904,117

[22] Filed: May 8, 1978

[30] Foreign Application Priority Data

May 11, 1977 [JP] Japan .................................. 52-54095
May 18, 1977 [JP] Japan .................................. 52-57429

[51] Int. Cl.³ ............................................. G11B 7/12
[52] U.S. Cl. ...................................... 369/45; 369/46; 369/112
[58] Field of Search ................ 179/100.3 V, 100.3 G, 179/100.1 G; 358/127, 128, 130–132, 128.5–128.6; 250/201, 202, 204, 203, 570; 365/124, 120, 127, 215; 350/140

[56] References Cited

U.S. PATENT DOCUMENTS

| | | | |
|---|---|---|---|
| 3,359,056 | 12/1967 | Offner | 350/190 |
| 4,011,400 | 3/1977 | Simons et al. | 179/100.3 V |
| 4,025,949 | 5/1977 | Whitman | 179/100.3 V |
| 4,037,929 | 7/1977 | Bricot et al. | 179/100.3 V |
| 4,059,841 | 11/1977 | Bricot et al. | 358/128 |
| 4,123,652 | 10/1978 | Bouwhuis | 179/100.3 V |
| 4,128,847 | 12/1978 | Roullet et al. | 179/100.3 V |

Primary Examiner—Raymond F. Cardillo, Jr.
Attorney, Agent, or Firm—Sughrue, Rothwell, Mion, Zinn and Macpeak

[57] ABSTRACT

In a focus servo apparatus for an optical type information read-out system having a light source, a condenser lens for focusing light from the light source on a recording surface of a recording medium and for focusing light reflected by the surface and containing the information recorded on the surface, a cylindrical lens for passing the reflected light, a light receiving element responsive to the reflected light from the cylindrical lens for providing an output and a driving device responsive to the output for regulating the position of the condenser lens relative to the surface, the cylindrical lens has its main, or primary, principal point substantially at the focusing point of the condenser lens for the reflected light and the physical axis of the cylindrical lens makes an angle of about 45° with respect to the moving direction of the recording medium.

3 Claims, 17 Drawing Figures

FOCUS SERVO DEVICE FOR USE IN AN OPTICAL INFORMATION READ-OUT DEVICE

BACKGROUND OF THE INVENTION

The present invention relates to a focus servo apparatus for use in an optical read-out system of information recorded on an optical video disk and, in particular, to a focus servo apparatus for a focusing lens of an information read-out system.

The optical video disk is usually in the form of a circular disk plate (6) made of a transparent material on one surface (7) of which a plurality of recesses (17) called pits are formed on and along a spiral track or on a plurality of circular tracks arranged coaxially as shown in FIG. 1a. The information is constituted by the length of the pit and the distance between the adjacent pits. In order to improve the reflectivity of the surface, a reflection layer is provided on the surface by vapor-depositing aluminum. A protective layer (18) is provided on the vapor-deposited aluminum layer, as shown in FIG. 1b which is a cross section of the disk in FIG. 1a.

A read-out of the information recorded on the disk is usually performed by directing a light to the other surface of the disk, detecting light reflected from the reflection layer on the one surface, which is modulated by pits, and demodulating the detected light.

In a read-out system of this type, a servo mechanism is necessary to control a lens system for focusing the incident light precisely on the reflection surface (7).

An example of the conventional focus servo apparatus is shown in FIG. 2, in which a light beam emitted from a light source (1) such as a helium-neon laser is passed through a collimater lens (2), a beam splitter (3) and a movable mirror (4) and condensed by a condenser lens 5 at a point near the recording surface (7) of the disk (6). The disk (6) is rotated at high speed by a motor (14). The reflected light containing the information recorded on the disk passes through these optical elements in the reverse direction, and is split by the beam splitter (3) and converted by a suitable photo-electric conversion element into an electric signal.

It is impossible, however, to fabricate the disk with complete flatness and, even if the disk is completely flat, it may be impossible to mount it on a shaft of the motor 14 without some tilting. Therefore, when the disk is rotated under such a tilted mounting condition, the disk may be vertically fluctuated.

In order to read-out the information on the fluctuating disk exactly, the condenser lens 5 must be moved vertically to follow the fluctuation to thereby condense the light at the exact point on or adjacent the recording surface 7 of the disk 6 during read-out. To this end, a cylindrical lens 8 is provided to receive the split light from the beam splitter 3. The light passed through the lens 8 is received by a light receiving element 9. The light receiving element 9 comprises four segments 9a, 9b, 9c and 9d as shown in FIG. 4b. The segments are arranged such that a straight line A connecting centers of light receiving faces of the segments 9a and 9b and a straight line B connecting centers of light receiving faces of the segments 9c and 9d are orthogonal to each other and either one of the straight lines is oriented in the same direction as a center axis of the cylindrical lens 8. Due to the fact that the focus positions of a light beam passed through the lens 8 in a plane including the lens 8 and in a plane orthogonal to the lens plane are different, contours of light bundles projected onto the light receiving faces of the segments 9a–9d of the light receiving element 9 are different, so that the positional relation between the recording surface 7 and the condenser lens 5 can be determined by using the difference in the output of the element 9.

That is, the light receiving surface of the element 9 is positioned so that when the focus point of the lens 5 is at a position in the plane of the recording surface of the disk, the contour of the reflection light after being passed through the lens 8 becomes substantially square (FIG. 4b).

With this position of the element 9, outputs Va, Vb, Vc and Vd of the respective light receiving segments are equal and, thus, the following equation is established:

$$Va + Vb = Vc + Vd$$

Accordingly, an output V of a differential amplifier 10 having differential inputs Va+Vb and Vc+Vd as shown in FIG. 3 becomes zero. Consequently, both the output of amplifier 11 and the output of a lens driving device 12 are zero and therefore the position of the lens is not changed.

In case the incident light is focussed behind the recording surface as shown by a dotted line in FIG. 5a, that is, the distance between the recording surface 7 and the condenser lens 5 is too small, the contour of the light in the light receiving plane of the element 9 is as shown in FIG. 5b. In this case, the sum of the output voltages Va and Vb of the segments 9a and 9b becomes larger than the sum of the output voltages Vc and Vd of the segments 9c and 9d, and, therefore, the output of the differential amplifier 10 becomes negative. On the other hand, in case the incident light is focussed in front of the recording surface 7 as shown in FIG. 6a, the cross sectional contour of the light incident on the receiving element 9 becomes as shown in FIG. 6b. Therefore, the sum of Va and Vb becomes smaller than the sum of Vc and Vd and the output V of the differential amplifier 10 becomes positive. Accordingly, assuming that $Z=0$ when the focussing position is in the recording surface 7 and $Z>0$ when the focussing position is shifted towards the condenser lens, the output V of the differential amplifier 10 can be represented by a dotted curve 20 in FIG. 7. This output of the differential amplifier 10 is amplified by the amplifier 11 as an error signal which is supplied to the driving device 12 to control the position of the condenser lens 5 through a holder 13 thereof.

In the conventional automatic focus servo device as mentioned above, when the movable mirror 4 or the condenser lens 5 is precisely positioned and the light is focussed on the track of the pits 17, i.e., when the tracking is properly performed, the track of the pits 17 is projected on and along the straight line connecting the centers of the segments 9a and 9b or 9c and 9d and the pits form elongated dark marks. As long as the tracking is performed properly, the output of the light receiving element 9 is maintained at zero if the focusing of the lens is on the recording surface. However, it is very difficult to maintain the tracking properly and thus the changing rates of values Va+Vb and Vc+Vd are usually small and different, causing an erroneous focus servo operation.

Therefore, in order to maintain the proper positional relationship between the light receiving surface of the light receiving element and the condenser lens, it is necessary to exclude the effect of the improper tracking.

SUMMARY OF THE INVENTION

An object of the present invention is to overcome the disadvantages of the conventional focus servo device for use in an optical information read-out device.

Another object of the present invention is to provide an improved focus servo device which makes a proper read-out of recorded information possible.

DETAILED DESCRIPTION OF THE PREFERRED EMBODIMENTS

Figure 1A:
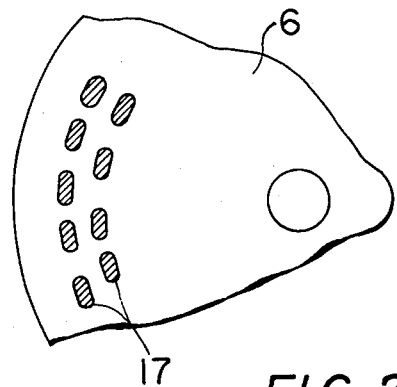
FIGS. 1a and 1b are a plane view of a portion of a video disk and a sectional view thereof, which were described already.
Figure 1B:
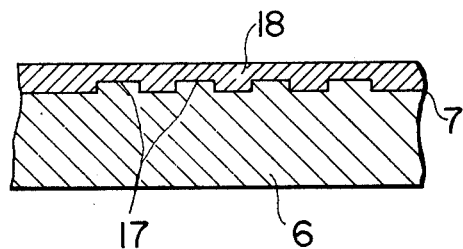
Figure 2:
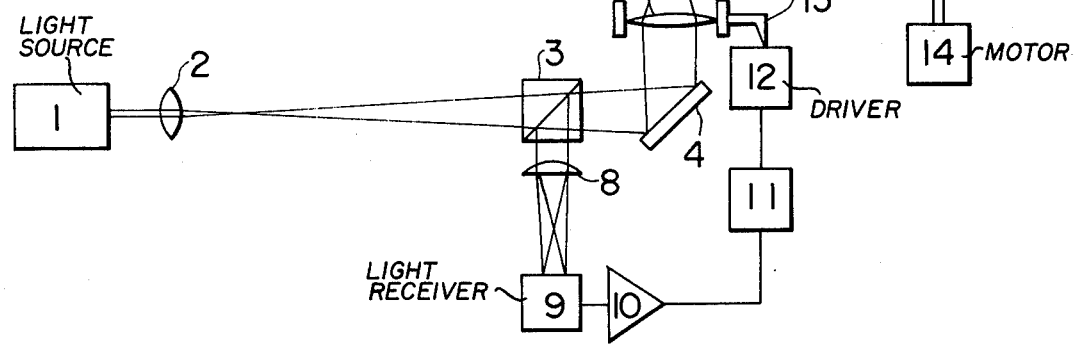
FIG. 2 is a schematic view of the conventional focus servo device, which was described already.
Figure 3:
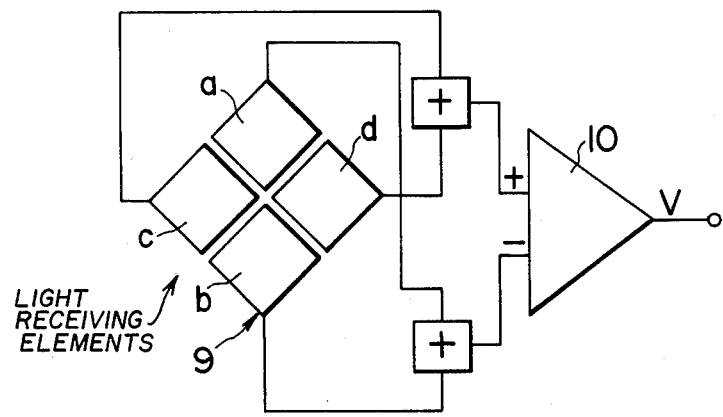
FIG. 3 is a schematic circuit diagram showing the relationship between a light receiving element and a differential amplifier, which was described already.
Figure 4A:
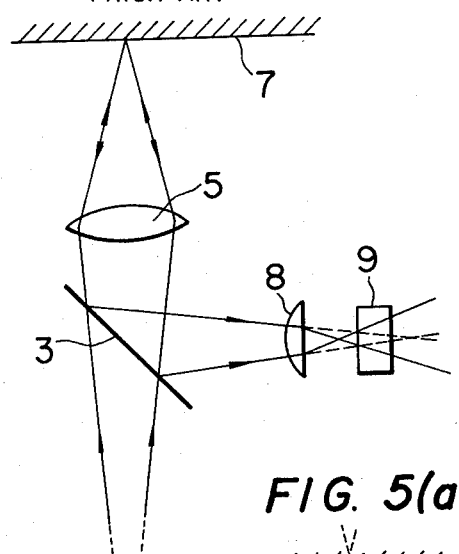
FIGS. 4a and 4b show a relationship between the recording surface of the video disk and a cylindrical lens and a cross sectioned contour of the light incident on the light receiving element, respectively, with the focus of the condenser lens being in the plane of the recording surface, which were described already.
Figure 4B:
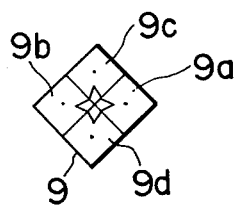
Figure 5A:
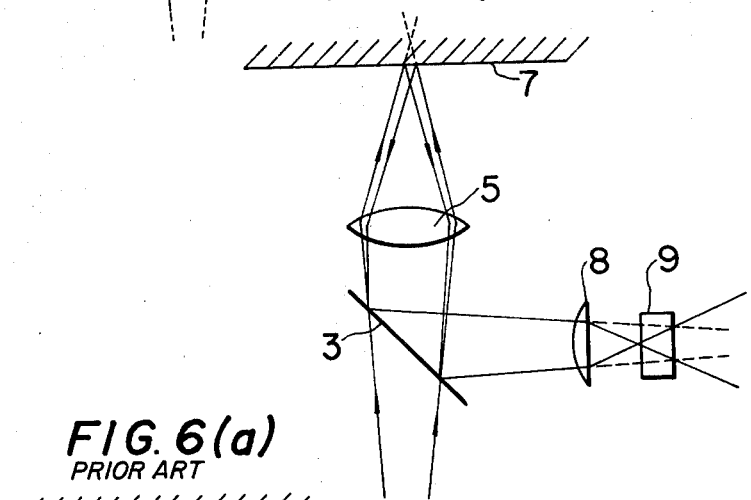
FIGS. 5a and 5b already described show relationships between the recording surface of the disk and the cylindrical lens and the cross sectional contour of the light, respectively, with the distance therebetween being shortened FIGS. 6a and 6b, already described, are similar views to those of FIGS. 5a and 5b, respectively, with the distance being increased FIG. 7, already described, is a graph showing a relationship between an output of the differential amplifier and the positions of the recording surface and the condenser lens.
Figure 5B:
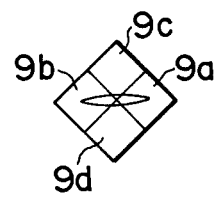
Figure 6A:
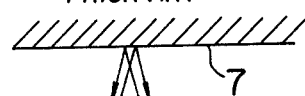
Figure 6B:
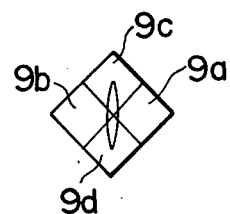
Figure 8:
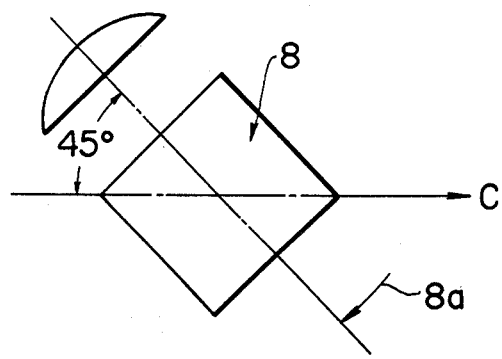
FIG. 8 shows an embodiment of the present invention showing an arrangement of the cylindrical lens in the focus servo device.

Fundamental components of an embodiment of the focus servo device for an optical information readout device according to the present invention are substantially the same as those included in the conventional device shown in FIG. 2. In the present invention, as shown in FIG. 8, the cylindrical lens 8 is arranged so that the physical axis 8a thereof makes an angle of 45° with respect to the direction C of the track of the pits 17, i.e., to the rotational direction of the video disk 6. Further, according to the present invention, the straight line connecting the centers of the light receiving segments 9a and 9b or the straight line connecting the centers of the light receiving segments 9c and 9d is made parallel to the optical axis 8a of the cylindrical lens 8 and makes an angle of about 45° with respect to the track direction C, as shown in FIG. 8.

Figure 9:
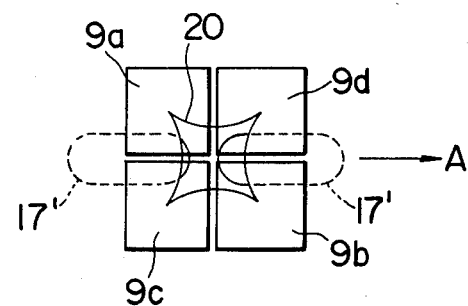
FIGS. 9 and 10 illustrate various contours and position of the light falling in the light receiving element of the focus servo device according to the present invention.

With this arrangement of the cylindrical lens 8, the reflection light reflected by the receiving surface 7 and passed through the condenser lens 5 is projected onto the light receiving segments 9a, 9b, 9c and 9d with a contour of a four concave-sided shape, and the dark marks 17' due to the pits 17 are at the positions as shown in FIG. 9.

Figure 10:
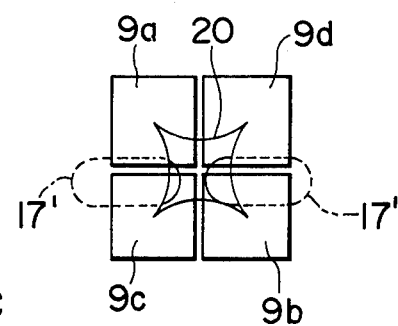

In this arrangement, even when the tracking is improper and the tracking position is shifted as shown in FIG. 10, the sum of the outputs of the light receiving segments 9a and 9b, Va+Vb, is always equal to the sum of the outputs of the light receiving segments 9c and 9d, Vc+Vd, provided that the focusing is properly maintained.

Therefore, according to the present invention, the desired focus servo can be performed even if the tracking is improper and the error signal for the tracking servo can be derived from the signals Va+Vd and Vb+Vc.

In the conventional focus servo device, the preciseness in positioning the light receiving surface of the light receiving element 9 and the cylindrical lens may be critical and the error signal to be detected may not be large enough to obtain the desired result, as mentioned previously.

Figure 11:
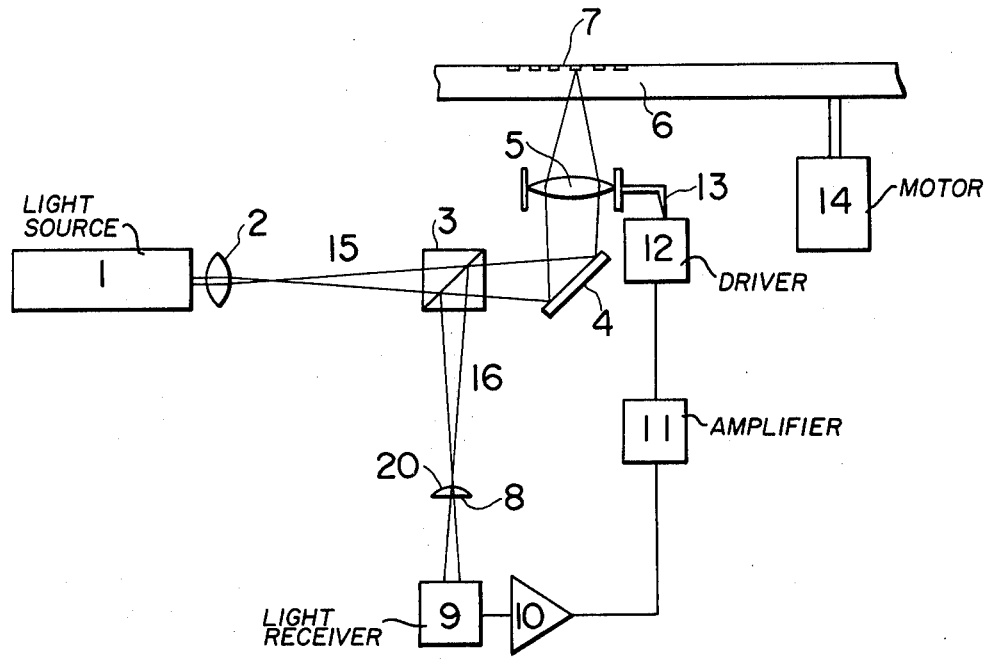
FIG. 11 is a schematic view of another embodiment of the present invention.

In order to improve this point, the cylindrical lens 8 is arranged with the principal point 30, i.e, the apex of the curved surface, of the cylindrical lens 8 being positioned at or in the vicinity of a position to which the reflected light is focussed by the condenser lens 5 when the incident light is correctly focussed on the recording surface 7 of the video disk 6 as shown in FIG. 11.

In this case, the distance between the cylindrical lens 8 and the light receiving element may be suitably selected. The positional relationships between other constructive elements may be similar to those in FIG. 2.

Figure 12A:
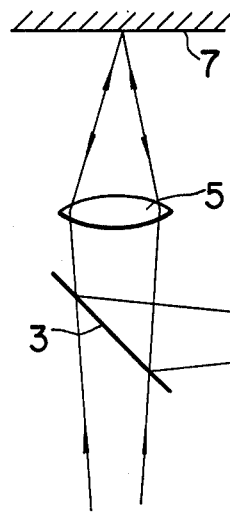
FIGS. 12a and 12b are views showing the relationship between the cylindrical lens and the light receiving element and the contour of the light falling on the light receiving face of the light receiving element, respectively, with the focus of the condenser lens being on the recording surface.
Figure 12B:
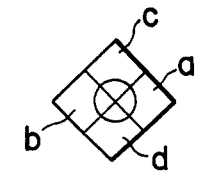

Consequently, when the incident light is correctly focussed on the recording surface of the video disk as shown in FIG. 12a, the cross sectional contour of the light falling on the light receiving element 9 becomes as shown in FIG. 12(b) and therefore the equation Va+Vb=Vc+Vd is established, causing the output of the differential amplifier 10 to be zero. Therefore, the driving device 12 is not actuated and the condenser lens 5 is kept in its place.

Figure 13A:
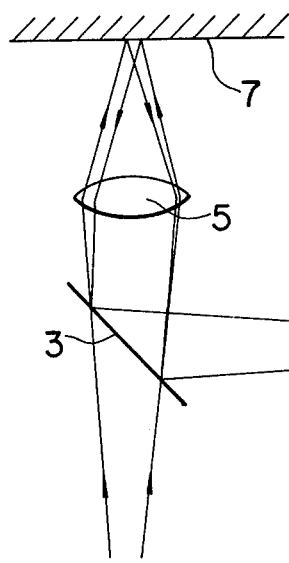
FIGS. 13a and 13b show the relationship of the cylindrical lens and the light receiving element and the cross sectional contour of the light falling on the element, respectively, with the recording surface of the disk being shifted towards the condenser lens.
Figure 13B:
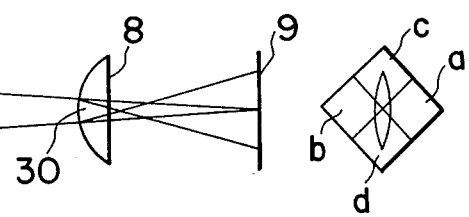

When the distance between the condenser lens 5 and the recording surface of the disk becomes smaller as shown in FIG. 13a, the cross sectional contour of the light falling on the light receiving surface of the light receiving element 9 becomes as shown in FIG. 13b and, therefore, the equation $Va+Vb>Vc+Vd$ is established causing the output V of the differential amplifier 10 to be negative.

Figure 14A:
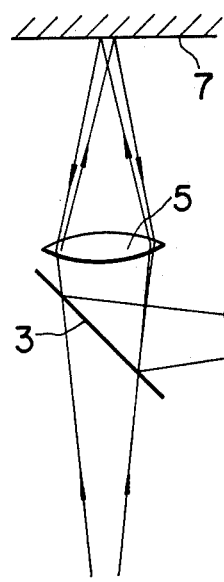
FIGS. 14a and 14b show the relationship of the cylindrical lens and the light receiving element and the cross sectional contour of the light falling on the element, respectively, with the recording surface of the disk being shifted away from the condenser lens.
Figure 14B:
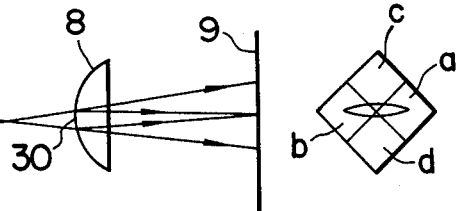

On the contrary, when the distance between the condenser lens 5 and the recording surface 7 of the video disk 6 becomes larger as shown in FIG. 14a, the contour of the light received by the light receiving element 9 becomes as shown in FIG. 14b, and therefore, the equation $Va+Vb<Vc+Vd$ is established, causing the output V of the differential amplifier 10 to be positive.

Figure 7:
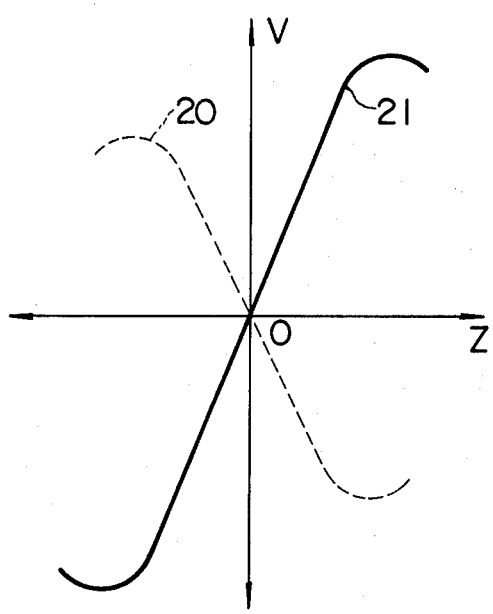

Accordingly, in the present invention, the output V of the differential amplifier 10 varies with the distance Z between the condenser lens 5 and the recording surface 7 of the disk, the relationship being depicted by a solid curve 21 in FIG. 7.

Figure 15:
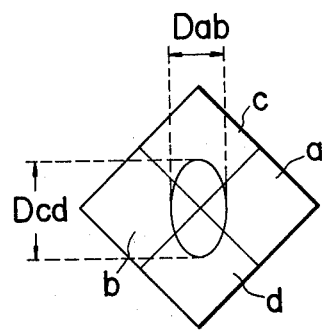
FIG. 15 shows an example of the contour of the light falling on the light receiving element.
Figure 16:
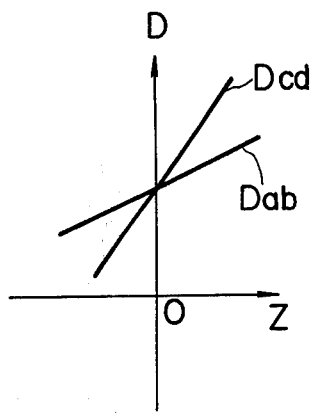
FIG. 16 is a graph showing a relationship between the cross sectional contour of the light falling on the light receiving element and the distance between the recording surface and the condenser lens of the conventional focus servo device.
Figure 17:
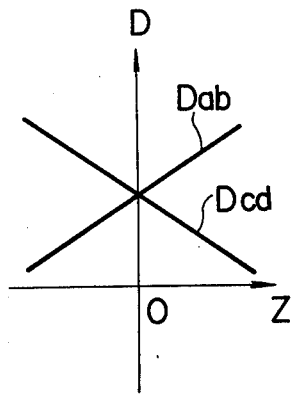
FIG. 17 is a similar graph to that in FIG. 16 obtainable by the focus servo device according to the present invention.

Further, when the size of the cross section of the light beam bundle falling on the light receiving segments 9a, 9b, 9c and 9d of the light receiving element 9 is selected to have a width Dab and a length Dcd as shown in FIG. 15, the dimensions Dab and Dcd are changed as shown in FIG. 16 when the conventional apparatus is used, while in the present apparatus they are changed as shown in FIG. 17.

It will be clear that the variation in the cross section of the light on the surface of the light receiving element 9 is picked up as an output of the light receiving element 9 and for larger variations of Dcd-Dab larger output of the differential amplifier 10 are provided. Thus, it is proved that the present invention is superior over the conventional apparatus.

Since, when a lens having a power of 30 to 40 is used as the condenser lens 5 and even when the position of the principal point 30 of the renticular lens 8 is shifted along its optical axis by 1 mm, there may be a change of the distance between the reflection surface 7 and the condenser 5 of only about 1 μm, there may be no need of positioning the renticular lens 8 with high precision. As will be clear, there may also be no need of determining the distance between the cylindrical lens 8 and the light receiving element 9 with high precision.

What is claimed is:

1. A focus servo apparatus for use in optical type information read-out system, said system of the type using a recording medium having a surface bearing at least one information recording track, said apparatus comprising:

a light source;

a first lens means for focusing the light from said light source onto said surface;

a cylindrical second lens means for passing light reflected by said surface and passed through said first lens means, said cylindrical second lens means having a primary principal point and being arranged such that said primary principal point is positioned substantially at the focal point of the reflected light passed through said first lens means; and means responsive to an output of said light receiving means for regulating the position of said first lens means so that the light from said light source is maintained in focus on the surface of said recording medium.

2. A focus servo apparatus as claimed in claim 1, characterized in that an axis of said cylindrical lens makes an angle of about 45° with respect to a moving direction of said recording medium.

3. A focus servo apparatus as claimed in claim 1 or 2, characterized in that said light receiving element comprises first and second pairs of discrete light receiving segments, said first pair of said light receiving segments having centers arranged on and along a first straight line and said second pair of said light receiving segments having centers arranged on and along a second straight line orthogonal to said first straight line and in that each of said first and second straight lines makes an angle of about 45° with respect to the moving direction of said recording medium.

* * * * *